United States Patent
Calistri-Yeh et al.

(10) Patent No.: US 8,024,331 B2
(45) Date of Patent: *Sep. 20, 2011

(54) CONSTRUCTION OF TRAINABLE SEMANTIC VECTORS AND CLUSTERING, CLASSIFICATION, AND SEARCHING USING TRAINABLE SEMANTIC VECTORS

(75) Inventors: Randall J. Calistri-Yeh, Webster, NY (US); Bo Yuan, Webster, NY (US); George B. Osborne, Macedon, NY (US); David L. Snyder, Pittsford, NY (US)

(73) Assignee: Manning & Napier Information Services, LLC., Rochester, NY (US)

( * ) Notice: Subject to any disclaimer, the term of this patent is extended or adjusted under 35 U.S.C. 154(b) by 489 days.

This patent is subject to a terminal disclaimer.

(21) Appl. No.: 12/131,878

(22) Filed: Jun. 2, 2008

(65) Prior Publication Data

US 2008/0281814 A1    Nov. 13, 2008

Related U.S. Application Data

(60) Continuation of application No. 10/823,617, filed on Apr. 14, 2004, now Pat. No. 7,444,356, and a continuation of application No. 10/823,685, filed on Apr. 14, 2004, now Pat. No. 7,406,456, each which is a division of application No. 09/562,916, filed on May 2, 2000, now Pat. No. 6,751,621.

(60) Provisional application No. 60/177,654, filed on Jan. 27, 2000.

(51) Int. Cl.
*G06F 17/28* (2006.01)

(52) U.S. Cl. ............... 707/728; 707/758; 707/E17.098; 704/9; 706/12

(58) Field of Classification Search ........... 707/999.005, 707/E17.098, 728, 758; 704/9; 706/12

See application file for complete search history.

(56) References Cited

U.S. PATENT DOCUMENTS

| | | | |
|---|---|---|---|
| 4,839,853 | A | 6/1989 | Deerwester et al. |
| 5,301,109 | A | 4/1994 | Landauer et al. |
| 5,379,366 | A | 1/1995 | Noyes |
| 5,404,506 | A | 4/1995 | Fujisawa et al. |
| 5,619,709 | A | 4/1997 | Caid et al. |
| 5,625,767 | A | 4/1997 | Bartell et al. |
| 5,715,468 | A | 2/1998 | Budzinski |
| 5,740,323 | A | 4/1998 | Nomura et al. |

(Continued)

OTHER PUBLICATIONS

Keinosuke Fukunaga et al., "A Criterion and an Algorithm for Grouping Data", IEEE Transactions on Computers, vol. C-19, No. 10, Oct. 1970, pp. 917-923.

(Continued)

*Primary Examiner* — Tim T. Vo
*Assistant Examiner* — Shiow-Jy Fan
(74) *Attorney, Agent, or Firm* — McDermott Will & Emery LLP

(57) ABSTRACT

An apparatus and method are disclosed for producing a semantic representation of information in a semantic space. The information is first represented in a table that stores values which indicate a relationship with predetermined categories. The categories correspond to dimensions in the semantic space. The significance of the information with respect to the predetermined categories is then determined. A trainable semantic vector (TSV) is constructed to provide a semantic representation of the information. The TSV has dimensions equal to the number of predetermined categories and represents the significance of the information relative to each of the predetermined categories. Various types of manipulation and analysis, such as searching, classification, and clustering, can subsequently be performed on a semantic level.

9 Claims, 12 Drawing Sheets

U.S. PATENT DOCUMENTS

| | | | |
|---|---|---|---|
| 5,790,754 | A | 8/1998 | Mozer et al. |
| 5,809,490 | A | 9/1998 | Guiver et al. |
| 5,826,268 | A | 10/1998 | Schaefer et al. |
| 5,828,999 | A | 10/1998 | Bellegarda et al. |
| 5,873,056 | A | 2/1999 | Liddy et al. |
| 5,924,105 | A | 7/1999 | Punch et al. |
| 5,937,384 | A | 8/1999 | Huang et al. |
| 5,963,940 | A | 10/1999 | Liddy et al. |
| 5,974,412 | A | 10/1999 | Hazlehurst et al. |
| 6,006,221 | A | 12/1999 | Liddy et al. |
| 6,021,387 | A | 2/2000 | Mozer et al. |
| 6,026,388 | A | 2/2000 | Liddy et al. |
| 6,076,088 | A | 6/2000 | Paik et al. |
| 6,138,116 | A | 10/2000 | Kitagawa et al. |
| 6,175,828 | B1 | 1/2001 | Kuromusha et al. |
| 6,189,002 | B1 | 2/2001 | Roitblat |
| 6,208,971 | B1 | 3/2001 | Bellegarda et al. |
| 6,216,112 | B1 | 4/2001 | Fuller et al. |
| 6,246,977 | B1 | 6/2001 | Messerly et al. |
| 6,263,335 | B1 | 7/2001 | Paik et al. |
| 6,269,361 | B1 | 7/2001 | Davis et al. |
| 6,269,368 | B1 | 7/2001 | Diamond |
| 6,289,353 | B1 | 9/2001 | Hazlehurst et al. |
| 6,304,864 | B1 | 10/2001 | Liddy et al. |
| 6,356,864 | B1 | 3/2002 | Foltz et al. |
| 6,405,199 | B1 | 6/2002 | Carter et al. |
| 6,418,434 | B1 | 7/2002 | Johnson et al. |
| 6,430,559 | B1 | 8/2002 | Zhai |
| 6,446,061 | B1 | 9/2002 | Doerre et al. |
| 6,513,027 | B1 | 1/2003 | Powers et al. |
| 6,523,026 | B1 | 2/2003 | Gillis |
| 6,725,227 | B1 | 4/2004 | Li |
| 6,751,621 | B1 | 6/2004 | Calistri-Yeh et al. |
| 6,766,287 | B1 | 7/2004 | Kupiec et al. |
| 6,816,857 | B1 | 11/2004 | Weissman et al. |
| 6,847,966 | B1 | 1/2005 | Sommer et al. |
| 7,299,247 | B2 | 11/2007 | Calistri-Yeh et al. |
| 2002/0026456 | A1* | 2/2002 | Bradford ............ 707/500 |
| 2002/0077916 | A1 | 6/2002 | Greene |
| 2003/0009526 | A1* | 1/2003 | Bellegarda et al. ...... 709/206 |
| 2003/0050921 | A1* | 3/2003 | Tokuda et al. ........... 707/3 |
| 2003/0149938 | A1 | 8/2003 | McElfresh et al. |
| 2003/0217335 | A1* | 11/2003 | Chung et al. ......... 715/514 |
| 2004/0059708 | A1 | 3/2004 | Dean et al. |
| 2004/0193414 | A1 | 9/2004 | Calistri-Yeh et al. |
| 2004/0199546 | A1 | 10/2004 | Calistri-Yeh et al. |
| 2006/0106783 | A1 | 5/2006 | Saffer et al. |

OTHER PUBLICATIONS

B.D. Ripley, "Neural Networks and Related Methods for Classification", J. R. Statist. Soc. B (1994), 56, No. 3, pp. 409-456.

Chidanand Apte and Fred Damerau, "Automated Learning of Decision Rules for Text Categorization", *ACM Transactions on Information Systems*, vol. 12, No. 3, Jul. 1994, pp. 233-251.

Elizabeth D. Liddy, Woojin Paik, Edmund S. Yu, "Text Categorization for Multiple Users Based on Semantic Features from a Machine-Readable Dictionary", *ACM transactions on information systems*, vol. 12. No. 3, Jul. 1994, pp. 278-295.

Randy Calistri-Yeh, Bo Yuan, "The MAPIT Patent-TSV System", Version 2.7, Jan. 11, 2000, pp. 1-77.

Stefan Wernter, Garen Arevian and Christo Panchev, "Recurrent Neural Network Learning for Text Routing", Artificial Neural Networks, Sep. 7-10, 1999, Conference Publication No. 470, pp. 898-903, Sunderland, UK.

Bartell-B-T and Cottrell-G-W and Belew-R-K, "Representing Documents Using an Explicit Model of their Similarities" J of the American Society for Information Science, May 1995.

Bullinaria-J-A and Huckle-C-C, "Modeling Lexical Decision Using Corpus Derived Semantic Representations in a Connectionist Network" Proc of the 4th Neural Computation and Psychology Workshop 1997.

Lewis-D-D, "Text Representation for Intelligent Text Retrieval: A Classification-Oriented View" 1992.

Liu-G-Z, "Semantic Vector Space Model: Implementation and Evaluation" J of the American Society for Information Science, May 1997.

Liu-G-Z, "The Semantic Vector Space Model (SVSM): A Text Representation and Search Technique" IEEE 1994.

Patel-M, "Extracting Semantic Representations from Large Text Corpora" Proc of the 4th Neural Computation and Psychology Workshop, 1997.

* cited by examiner

|        | $CAT_1$ | $CAT_2$ | $CAT_3$ | $CAT_4$ | $CAT_5$ |
|--------|------|------|------|------|------|
| $u(W_1)$ | 0.00 | 0.74 | 0.00 | 0.00 | 0.10 |
| $u(W_2)$ | 0.09 | 0.15 | 0.20 | 0.36 | 0.03 |
| $u(W_3)$ | 0.73 | 0.00 | 0.48 | 0.04 | 0.00 |
| $u(W_4)$ | 0.00 | 0.07 | 0.08 | 0.48 | 0.11 |
| $u(W_5)$ | 0.18 | 0.04 | 0.25 | 0.12 | 0.11 |
|        |      |      |      |      |      |
| $v(W_1)$ | 0.00 | 0.71 | 0.00 | 0.00 | 0.29 |
| $v(W_2)$ | 0.04 | 0.17 | 0.33 | 0.38 | 0.08 |
| $v(W_3)$ | 0.29 | 0.00 | 0.68 | 0.04 | 0.00 |
| $v(W_4)$ | 0.00 | 0.08 | 0.12 | 0.46 | 0.35 |
| $v(W_5)$ | 0.08 | 0.04 | 0.40 | 0.12 | 0.36 |

Figure 9

|          | $CAT_1$ | $CAT_2$ | $CAT_3$ | $CAT_4$ | $CAT_5$ |
|----------|------|------|------|------|------|
| $TSV(W_1)$ | 0.00 | 0.72 | 0.00 | 0.00 | 0.24 |
| $TSV(W_2)$ | 0.05 | 0.16 | 0.30 | 0.37 | 0.07 |
| $TSV(W_3)$ | 0.40 | 0.00 | 0.63 | 0.04 | 0.00 |
| $TSV(W_4)$ | 0.00 | 0.08 | 0.11 | 0.47 | 0.29 |
| $TSV(W_5)$ | 0.11 | 0.04 | 0.36 | 0.12 | 0.30 |

Figure 10

| Words | Categories | |
|---|---|---|
|  | X | Y |
| $W_1$ | 1.00 | 2.00 |
| $W_2$ | 1.00 | 5.00 |
| $W_3$ | 2.00 | 6.00 |
| $W_4$ | 3.00 | 4.00 |
| $W_5$ | 4.00 | 1.00 |
| $W_6$ | 5.00 | 1.00 |
| $W_7$ | 5.00 | 4.00 |
| $W_8$ | 6.00 | 5.00 |
| $W_9$ | 6.00 | 2.00 |
| $W_{10}$ | 8.00 | 4.00 |
| $W_{11}$ | 8.00 | 2.00 |
| $W_{12}$ | 4.00 | 6.00 |

CONSTRUCTION OF TRAINABLE SEMANTIC VECTORS AND CLUSTERING, CLASSIFICATION, AND SEARCHING USING TRAINABLE SEMANTIC VECTORS

RELATED APPLICATIONS

This application is a continuation of U.S. patent application Ser. No. 10/823,617, filed on Apr. 14, 2004 now U.S. Pat. No. 7,444,356 and entitled "CONSTRUCTION OF TRAINABLE SEMANTIC VECTORS AND CLUSTERING, CLASSIFICATION, AND SEARCHING USING TRAINABLE SEMANTIC VECTORS," and of U.S. patent application Ser. No. 10/823,685, filed on Apr. 14, 2004 now U.S. Pat. No. 7,406,456 and entitled "CONSTRUCTION OF TRAINABLE SEMANTIC VECTORS AND CLUSTERING, CLASSIFICATION, AND SEARCHING USING TRAINABLE SEMANTIC VECTORS," both of which are divisional applications of U.S. application Ser. No. 09/562,916, filed May 2, 2000 now U.S. Pat. No. 6,751,621, entitled "CONSTRUCTION OF TRAINABLE SEMANTIC VECTORS AND CLUSTERING, CLASSIFICATION, AND SEARCHING USING TRAINABLE-SEMANTIC VECTORS," which claims priority from U.S. Provisional Patent Application No. 60/177,654, filed Jan. 27, 2000, the disclosures of which are incorporated herein by reference.

BACKGROUND OF THE INVENTION

1. Technical Field

The present invention relates to information analysis and, more particularly, to a semantic representation of information and analysis of the information based on its semantic representation.

2. Description of the Related Art

The ever-increasing demands for accurate and predictive analysis of data has resulted in complicated processes that requires massive storage capacity and computational power. The amount and type of information required for different types of analysis can further vary based on the required results. Oftentimes, it is necessary to filter the required information from a storage system in order to perform the desired analysis. One method of storing information is through the use of relational database tables. A specific location is designed for high capacity storage and used to maintain the information. Currently, the location can be local or off-site. Regardless of the location, various types of network and internetworking connections (i.e., LAN, WAN, Internet) can be used to access the information.

The most common method of accessing and filtering information is through the use of a query. A query is an instruction or process for searching and extracting information from a database. The query can also be used to dictate the manner in which the extracted information is presented. There are various types of queries, and each can be presented in different ways, depending on the specific database system being used. One popular query type is a Boolean query. Such a query in presented in the form of terms and operators. A term corresponds to required information, while the operators indicate a logical relationship between, for example, different terms. There are certain query types that can be presented only in the form of terms. The system receiving the query is then responsible for performing advanced analysis to determine the most appropriate relationships for the terms.

There are various systems that exist for analyzing information. Such analysis can include searching, clustering, and classification. For example, there are a number of systems that allow a query for a search to be received as input in order to retrieve a set of documents from a database. There are other systems that will take a set of documents and cluster them together based on prescribed criteria. There are systems that, given a set of topics or categories, will receive and assign new documents to one of those categories.

As used herein, clustering can be defined as a process of grouping items into different unspecified categories based on certain features of the items. In the case of document clustering, this can be considered as the grouping of documents into different categories based on topic (i.e., literature, physics, chemistry, etc.). Alternatively, the collection of items can be provided in conjunction with some fixed number of predefined categories or bins. The items would then be classified or assigned to the respective bins, and the process is referred to as classification.

Most current systems perform search, clustering, and classification based on key words or other syntactic (i.e., word-based) level of analysis of the documents. These systems have the disadvantage that their performance is restricted by their ability to match only on the level of individual words. For example, such systems are unable to decipher whether a particular word is used in a different context within different documents. Further, such systems are unable to recognize when two different words have substantially identical meanings (i.e., mean the same thing). Consequently, the results of a search will often contain irrelevant documents. Such systems are also highly dependent on a user's knowledge of a subject area for selecting terms that most accurately represent the desired results. Another disadvantage of current systems is the inability to accurately cluster and classify documents. This inability is due, in part, because of the restriction to matching on the level of individual words.

Consequently, such systems are unable to accurately perform high level searching, clustering, and classification. Such systems are also often unable to perform these tasks with a high degree of efficiency, especially when documents can be hundreds or thousands of pages long and when vocabularies can cover millions of words.

Accordingly, there exists a need for representing information at a level that does not restrict searching to the level of individual words. There also exists a need for automatically training this semantic representation to allow customized representations in different domains. There also exists a need for an ability to cluster and classify information based on a higher level than individual words.

SUMMARY OF THE INVENTION

An advantage of the present invention is the ability to represent information on a semantic level. Another advantage of the present advantage is the ability to automatically customize the semantic level based on user-defined topics. Another advantage is the ability to automatically train new semantic representations based solely on sample assignments to categories. A further advantage of this invention is the ability to automatically create a semantic lexicon, rather than requiring that a pre-constructed lexicon be supplied. A further advantage is the ability to construct semantic representations without the need to perform difficult and expensive linguistic tasks such as deep parsing and full word-sense disambiguation. A still further advantage is the ability to scale to real-world problems involving hundreds of thousands of terms, millions of documents, and thousands of categories. A still further advantage of the present invention is the ability to search, clusters, and classify information based on its semantic representation.

These and other advantages are achieved by the present invention wherein a trainable semantic vector (TSV) is used to provide a semantic representation of information or items, such as documents, in order facilitate operations such as searching, clustering, and classification on a semantic level.

Additional advantages and novel features of the present invention will be set forth in part in the description which follows, and in part will become apparent to those skilled in the art upon examination of the following, or may be learned by practice of the present invention. The embodiments shown and described provide an illustration of the best mode contemplated for carrying out the present invention. The invention is capable of modifications in various obvious respects, all without departing from the spirit and scope thereof. Accordingly, the drawings and description are to be regarded as illustrative in nature, and not as restrictive. The advantages of the present invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 9 is a table illustrating values corresponding to the significance of the words from FIG. 8;

FIG. 10 is a table illustrating a representation of the words from FIG. 8 in a semantic space;

DETAILED DESCRIPTION OF THE ILLUSTRATED EMBODIMENTS

A method and apparatus are described for creating a semantic representation of information. The semantic representation is achieved using a trainable semantic vector (TSV). The TSV provides semantic capabilities for representing, reasoning about, searching, classifying, and clustering information. In the following description, for the purposes of explanation, numerous specific details are set forth in order to provide a thorough understanding of the present invention. It will be apparent to one skilled in the art, however, that the present invention may be practiced without these specific details. In other instances, well-known structures and devices are shown in block diagram form in order to avoid unnecessarily obscuring the present invention.

The present system provides semantic capabilities for representing, reasoning about, searching, classifying, and clustering documents. One focus of the present system is for use in conjunction with U.S. patents as the documents to be clustered, classified, and/or searched. However, applications of the present system extend beyond patents. The present system can be trained using any text, and provides the ability to automatically extract a semantic representation of the document and use that representation for clustering, classifying, and searching.

Hardware Overview

Figure 1:
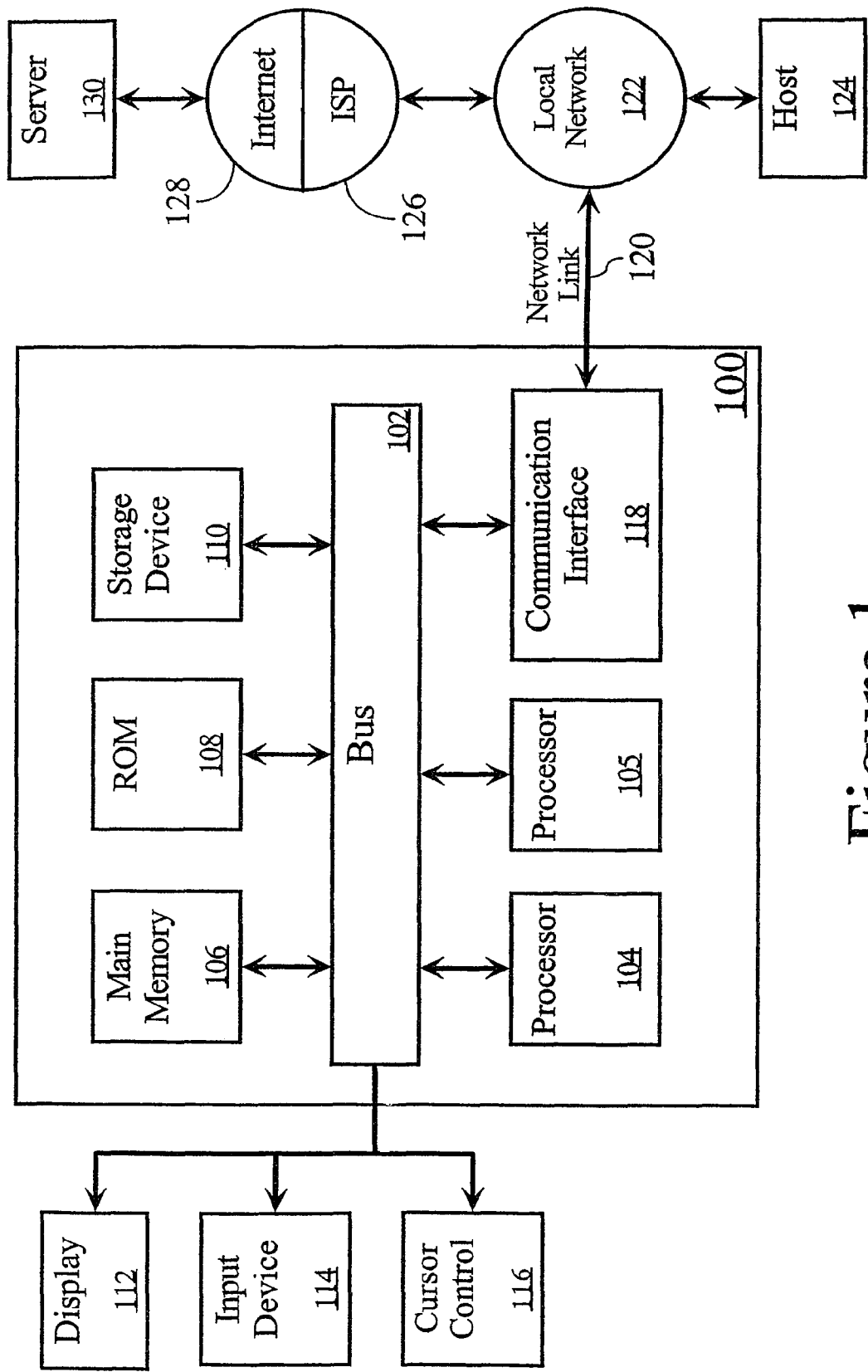
FIG. 1 is a block diagram illustrating a computer system that may be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for constructing TSVs representative of various types of information. Computer system 100 can also be used to perform various operations, such as clustering, classification, and searching, on the information using its semantic representation. According to one embodiment of the invention, construction of TSVs and semantic operations are is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, and volatile media. Non-volatile media include, for example, optical or magnetic disks, such as storage device 110. Volatile media include dynamic memory, such as main memory 106. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for constructing TSVs and performing various semantic operations as described herein. The received code may be executed by processor 104 as it is received, and/or stored in storage device 110, or other non-volatile storage for later execution. In this manner, computer system 100 may obtain application code in the form of a carrier wave.

Constructing Trainable Semantic Vectors

Figure 2:
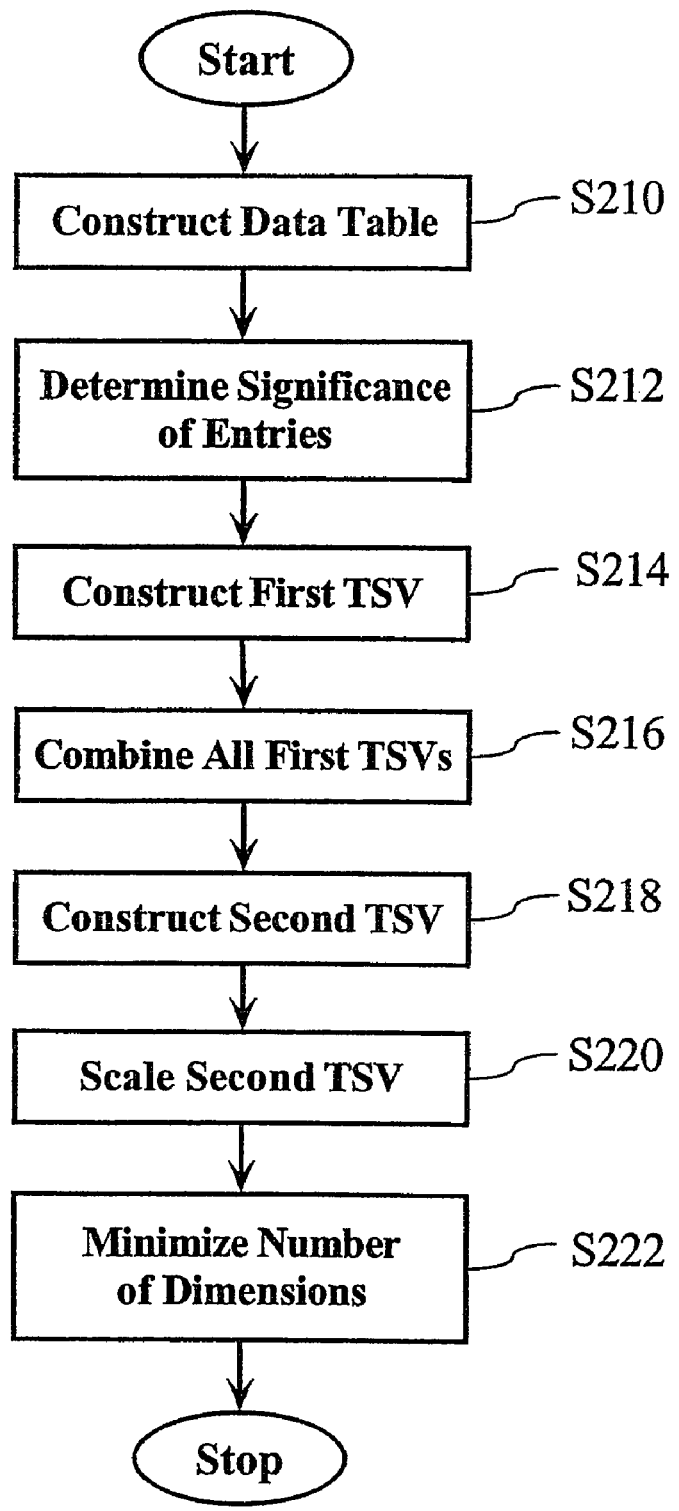
FIG. 2 is a flow chart illustrating construction of a trainable semantic vector according to the present invention.

FIG. 2 is a flow chart illustrating the steps performed in constructing a semantic representation of a dataset within a semantic space (i.e., a TSV). At step S210, a data table is constructed. The data table stores information that is indicative of a relationship between data points and predetermined categories. This data table contains training data from sample datasets that facilitate training for a new semantic space. It is necessary to construct a new data table only when moving to a new semantic space. According to the disclosed embodiment of the invention, each entry in the data table establishes a relationship between a data point and a category. For example, an entry in the data table can correspond to the number of sample datasets, within a category, that contain a particular data point. The data points correspond to the contents of the sample datasets, while the predetermined categories correspond to dimensions of the semantic space.

It may be the case that there is no initial mapping between sample datasets and categories, or that there are no initial categories to form the TSV dimensions that define the semantic space. In such a case, it is possible to bootstrap the construction of new TSV dimensions by running any traditional clustering algorithm, for example a keyword-clustering algorithm, to assign the sample datasets to initial clusters. Each of the resulting clusters can then be considered a new separate TSV dimension, and each sample dataset can be assigned to the dimension corresponding to the cluster to which the dataset belongs. The data table is then constructed as described previously.

As used in the description which follows, the term "dataset" refers to any type of information that can be classified, searched, clustered, etc. For example, a dataset can be representative of a document, book, fruit, painting, etc. The term "data point" refers to information that can be related to the dataset.

Although it is sometimes useful to distinguish between data points, datasets, and collections of datasets, for example, to describe the TSV of a dataset in terms of the TSVs of its included data points, the three terms can also be used interchangeably. For example, a document can be a dataset composed of word data points, or a document can be a data point within a cluster of datasets. In particular, words, documents, and collections of documents can be represented using TSVs in the same semantic space and thus can be compared directly.

For example, if the dataset is representative of document, then a data point could be representative of words, phrases, and/or sentences contained in the document. According to the disclosed embodiment of the invention, data points are derivationally stemmed words and phrases. It should be noted, however, that the data point can also be representative of any type of information that can be related back to the original dataset. In the case of documents, for example, a data point can be representative of information such as bibliographic information (e.g. author), full words, sentences, typography, punctuation, pictures, or arbitrary character strings. In a mathematical sense, a dataset can be considered a collection of entries. Each entry in the collection would then correspond to a data point.

At step S212, the significance of the entries (i.e. the data points) in the data table is determined. The significance of the entries can, under certain situations, be considered the relative strength with which an entry occurs in a particular category, or its relevance to a particular category. Such a relationship, however, should not be considered limiting. The significance of each entry is only restricted to the actual dataset and categories (i.e. features, that are considered significant for representing and describing the category). According to one embodiment of the invention, the significance of each entry is determined based on the statistical behavior of the entries across all categories. This can be accomplished by first calculating the percentage of data points occurring in each category according to the following formula:

$$u = \text{Prob}(\text{entry}|\text{category}) = (\text{entry}_n, \text{category}_m)/\text{category}_{m\_total}$$

Next, the probability distribution of a data point's occurrence across all categories is calculated according to the following formula:

$$v = \text{Prob}(\text{category}|\text{entry}) = (\text{entry}, \text{category}_m)/\text{entry}_{n\_total}$$

Both u and v represent the strength with which an entry is associated with a particular category. For example, if an entry occurs in only a small number of datasets from a category but doesn't appear in any other categories, it would have a high v value and a low u value for that category. If the entry appears in most datasets from a category but also appears in several other categories, then it would have a high u value and a low v value for that category.

Depending on the quantity and type of information being represented, additional data manipulation can be performed to improve the determined significance of the entry. For example, the value of u for each category can be normalized (i.e., divided) by the sum of all values for a data point, thus allowing an interpretation as a probability distribution.

A weighted average of u and v can also be used to determine the significance of data points, according to the following formula:

$$\alpha(v) + (1-\alpha)(u)$$

The variable α is a weighting factor that can be determined based on the information being represented and analyzed. According to one embodiment of the present invention, the weighting factor has a value of about 0.75. Other values can be selected depending on various factors such as the type and quantity of information, or the level of detail necessary to represent the information. Through empirical evidence gathered from experimentation, the inventors have determined that the weighted average of the u and v vectors can produce superior results than achievable without the use of a weighting factor.

At step S214, a first TSV is constructed. The first TSV corresponds to a semantic representation for each entry, or data point, across the semantic space (i.e., the predetermined categories). According to the disclosed embodiment of the invention, the first TSV stores values corresponding to the determined significance of a data point for each category, as previously described. Accordingly, a first TSV must be constructed for each data point in the data table. Furthermore, each of the first TSVs has dimensions equal to the number of predetermined categories. The values stored in the first TSV indicate a data point's relative strength within the data table with respect to each of the predetermined categories.

At step S216, all the first TSVs are combined. The manner in which the first TSVs are combined depends upon the specific implementation of the invention. For example, according to one embodiment of the invention, the first TSVs are combined using a vector addition operation. It should be appreciated, however, that the TSVs can also be combined using different operations such as, for example, taking a vector average of all the first TSVs. Step S218 indicates the result of the combination of the first TSVs. Specifically, step S218 results in the construction of a second TSV. The second TSV is a semantic representation of the dataset within the same semantic space as that used for the first TSVs.

At step S220, the second TSV is scaled. As suggested by the phantom lines, step S220 is not necessary to represent the dataset within the semantic space. Depending on the actual information being represented by the dataset and its entries, however, step S220 can improve the robustness of the dataset's representation within the semantic space. According to one embodiment of the present invention, the second TSV is scaled using a vote vector. The vote vector is used to determine, for each category, the number of entries from the dataset that make at least a minimum contribution to that category. If a particular entry does not hit a minimum number of categories with a certain strength, then that entry can be restricted from representing that dataset. Each entry within the vote vector (i.e., the vote value) is a value that indicates the number of positive entries present in the first TSV's corresponding dimensions for the dataset. Various restrictions can also be placed on the vote vector in order to improve results for certain types of information. For example, the vote vector can be constructed such that each entry (i.e., vote value) is at least 10. Furthermore, a predetermined minimum value, such as about 0.5, can be required for each category of the second TSV in order to count as a vote value.

At step S222, which is also optional, the second TSV can be minimized in order to reduce the amount of storage space required to maintain and perform operations on the dataset. Such a procedure has an advantage of keeping the size of the second TSV to a reasonable level, without sacrificing the accuracy with which it represents the dataset.

Figure 3:
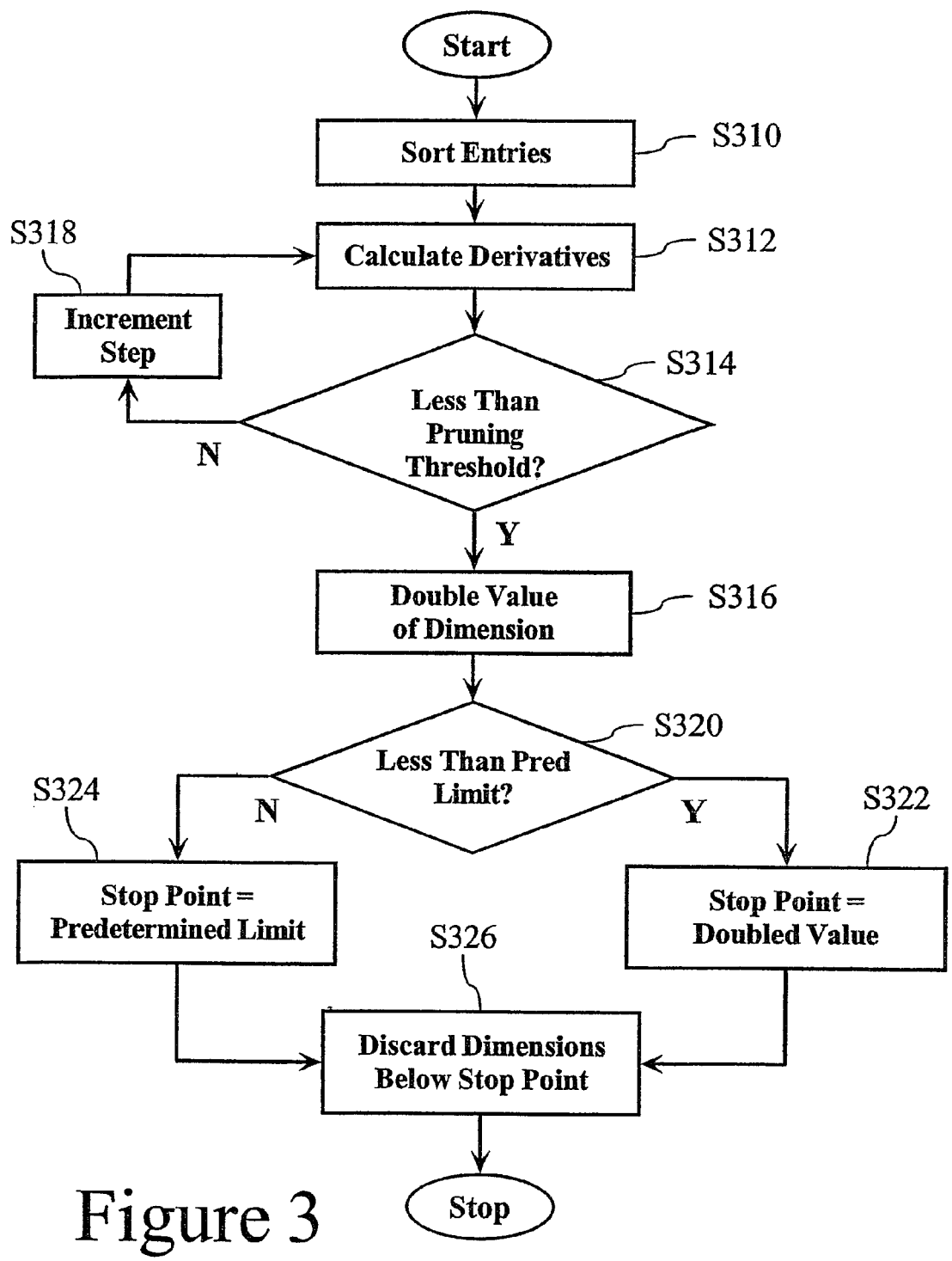
FIG. 3 is a flow chart illustrating minimization of dimensions contained in a trainable semantic vector.

FIG. 3 is a flow chart illustrating the steps performed in minimizing the second TSV's dimensions, according to an exemplary embodiment of the present invention. At step S310, the entries within the second TSV are sorted. According to the disclosed embodiment of the invention, the entries are sorted in descending order. The entries can, however, be sorted in increasing order or any desired relationship. At step S312, the derivatives of the entries from the second TSV are calculated. Specifically, the first and second derivatives are calculated at prescribed dimensions of the second TSV. Various techniques can be employed for numerically calculating the first and second derivatives. For example, the first and second derivatives can be approximated using the following two formulas:

$$d1(i) = \text{TSV}(i+\text{step}) - \text{TSV}(i) \text{ and}$$

$$d2(i) = \text{TSV}(i+\text{step}) - 2*\text{TSV}(i) + \text{TSV}(i-\text{step}),$$

where d1 represents the first derivative, d2 represents the second derivative, and step corresponds to a constant that defines an interval around the index i.

At step S314, the first and second derivatives are compared to first and second pruning thresholds, respectively. The first and second pruning thresholds correspond to values beyond which the effect of the first and second derivatives will be immaterial for minimizing the number of dimensions of the second TSV. According to one embodiment of the present invention, the first pruning threshold is assigned a value of about 0.05, while the second pruning threshold is assigned a value of about 0.005. The pruning thresholds are selected based on the information being represented by the dataset and the entries, and can be automatically determined based on various criteria or input by a user.

If the first and second derivatives are less than the pruning thresholds, then control passes to step S316. If the first and second derivatives, however, are greater than the pruning thresholds, then control passes to step S318 where a counter is incremented. Based on the new counter, the derivatives are again calculated at step S312. The counter represents the step size at which the first and second derivatives are calculated. Any appropriate integer value such as, for example, 10, can be used as a counter. The only requirement is that counter be selected so as to facilitate meaningful calculations of the derivatives. At step S316, the current value of the dimension at which the derivatives were last calculated is doubled. The doubled value is then compared to a predetermined limit at step S320. The predetermined limit is the maximum number of dimensions acceptable for the minimized second TSV. The maximum number of dimensions can be automatically selected, or input by the user. If the doubled value is less than the predetermined limit, then control passes to step S322. At step S322, a stop point is determined based on the doubled value. If the doubled value is greater than the predetermined limit, however, control passes to step S324. At step S324, the stop point is determined based on the predetermined limit. Regardless of whether or not the doubled value is less than the predetermined limit, control will subsequently pass the step S326. At this point, all dimensions below the stop point are discarded in order to reduce the size of the second TSV.

Data Point—TSV Analysis

It can be beneficial to perform a TSV analysis with respect to the data points, or entries, in order to properly build the second TSV. The analysis helps reduce noise at the first TSV level and simplifies the computational complexity of building second TSVs. As previously stated, a first TSV is a multi-dimensional semantic vector for the data point. The number of non-zero value dimensions of the first TSV reflects how general or how specific the semantic meaning of the data point is. When the number of non-zero value dimensions of a first TSV is close to the dimension of the entire semantic space, its semantic meaning is very broad, and the data point contributes very little semantic information in building the second TSV. When the number of non-zero value dimensions of a first TSV is close to 1, its semantic meaning is very specific. Using such data points do not necessarily improve the semantic contribution for building the second TSV and can sometimes introduce noise into the second TSV if the system does not have sufficient statistics to trust the definition of the word.

There are several ways to eliminate, or minimize, these two types of data points. The simplest way is to eliminate a data point that is contained in more than a predetermined number of datasets or contained in less than a predetermined number of datasets. In the case of documents and words, for example, such a method is based on the assumption that if a word is contained in a large number of documents, then its semantic meaning may be overly broad. Likewise, if a data point is contained in a small number of datasets, then its semantic meaning may be too narrow.

Another way to minimize such first TSVs is to analyze the distribution of the semantic vector itself (i.e., the TSV). For a given first TSV, its semantic dimensions are first sorted in descending order. Next, a cutting point is calculated such that 90% of the total mass of the first TSV is above the cutting point, where mass is the sum of the values of all the dimensions of the TSV. Any dimensions that fall below the cutting point are discarded, and the TSV is renormalized. By cutting a semantic vector in this way, the dimensionality of a first TSV can be greatly reduced. This can advantageously reduce the amount of space required to keep the first TSVs in memory, hence allowing more efficient construction of the second TSVs. Accordingly, overall processing time can be greatly reduced.

Clustering Information Using Trainable Semantic Vectors

The present invention provides an ability to cluster documents in an improved and efficient manner. As previously stated, clustering is a process of grouping information based on certain relationships. In the case of document clustering, this can be considered as the grouping of documents into different unspecified categories based on topic (i.e., literature, physics, chemistry, etc.). For example, an unorganized collection of items can be taken and organized into new categories (clusters) based on semantic relationships.

Figure 4:
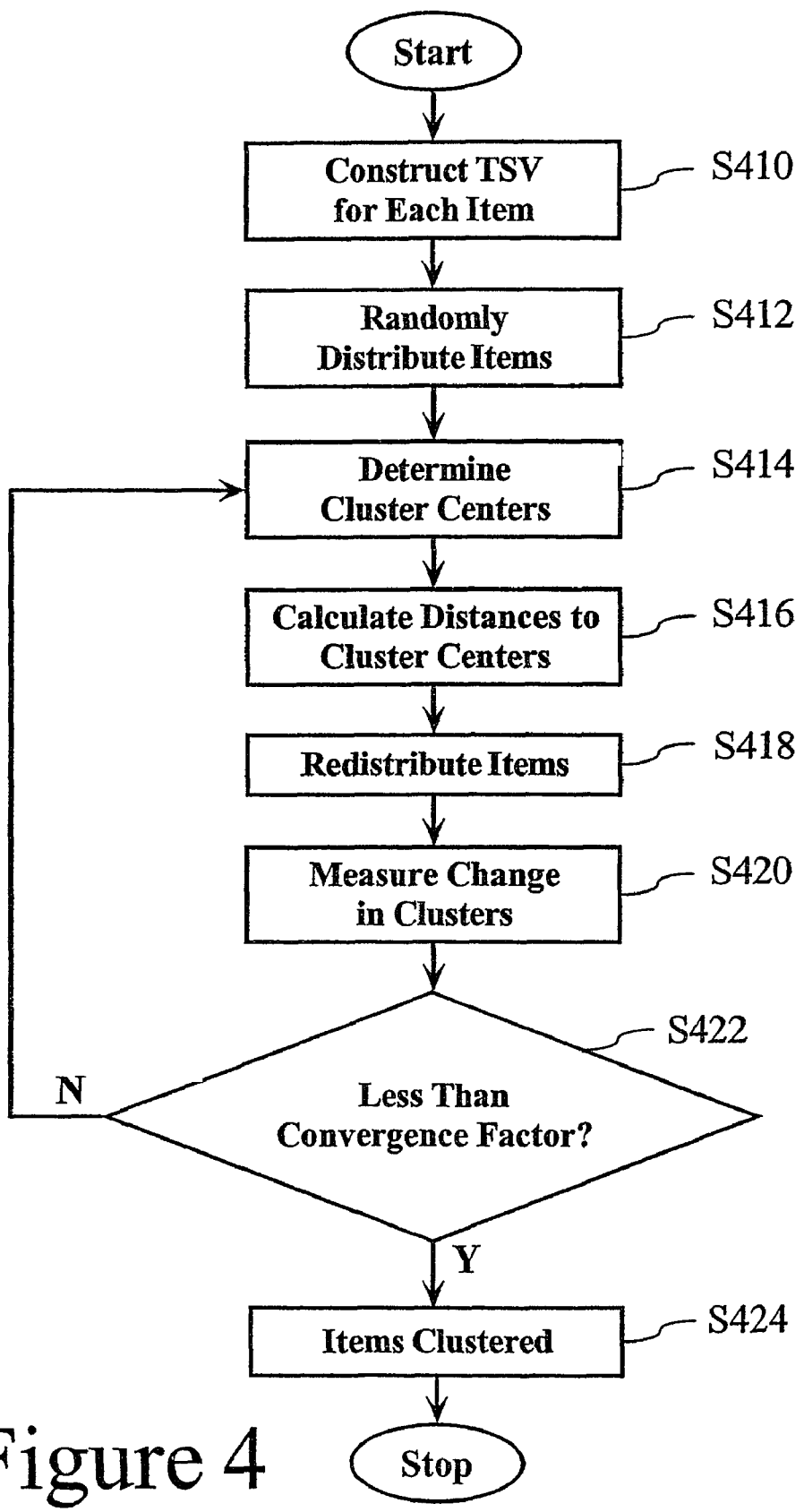
FIG. 4 is a flow chart illustrating clustering of items according to an embodiment of the present invention.

Referring to FIG. 4, a flow chart is shown for illustrating the steps performed in clustering a number of items based on their semantic representation. At step S410, a TSV is constructed for each item. Construction of the TSV is performed consistent with the previous description provided with reference to FIG. 2. According to the embodiment of the invention illustrated in FIG. 2, the items can further correspond to entries within a dataset, or the actual dataset itself. It should be noted, however, that the TSVs can be clustered regardless of the physical representations of the item since the nature of the TSV remains consistent.

At step S412, the items are randomly distributed among a plurality of clusters. The number of clusters can be predetermined and entered by the user, or it may be determined during the clustering process based on the number of items to be clustered. According to one embodiment of the present invention, the same number of items are initially distributed to each cluster. For example, although there is no specific relationship between the items within a cluster when initially distributed, each cluster will contain the same number of items.

At step S414, a cluster center is determined. According to the disclosed embodiment of the invention, the cluster center is determined by taking an average of the TSVs within each cluster. The result is an average TSV whose entries are representative of all items within the cluster and across all dimensions of the semantic space. The average TSV can be determined, for example, by calculating the average values of respective dimensions from the TSVs for items within a cluster. At step S416, the distance from each item to all cluster centers is calculated. For example, the distance between the first item to each cluster center would first be calculated. Next, the distance between the second item to each cluster center is calculated. This process continues until all items have been examined. Distance is preferably measured by Euclidean distance in multi-dimensional space, but any typical distance measure, such as Hamming distance, Minkowski distance, or Mahalanobis distance, can be used.

At step S418, the items are redistributed based on their distance to the cluster centers. Specifically, each item is reassigned to the cluster whose center is closest to that item. For example consider an item A whose distance from cluster centers $C^c_1$, $C^c_2$, and $C^c_3$ is [10, 5, 18]. Regardless of the cluster where the item was initially assigned, it would be reassigned to cluster $C_2$ because it has the shortest distance.

At step S420, the change in clusters is measured. According to one embodiment of the present invention, this change is measured by the change in the energy function of the summation of the distance from each data point to its assigned cluster center. Alternate calculations can also be performed, for example, to determine a single value that corresponds to an overall change in the clusters. At step S422, the change in clusters is compared to a predetermined convergence factor. If the change in clusters is less than the convergence factor, then control passes to step S424. If, however, the change in clusters is not less than the convergence factor, then control returns to step S414 where the cluster centers are recalculated and the items are redistributed. According to the disclosed embodiment of the invention, the predetermined convergence factor is assigned a value of 0.0001.

Depending on the manner in which the change in cluster centers is calculated, step S422 can be performed in different ways. For example, if a single value is determined for the change in cluster centers, then only that value is compared to the convergence factor. On the other hand, if the change in each cluster center is individually determined, then the change in each cluster can be compared to the convergence factor until each cluster reaches a point of stability. At step S424, the items are clustered and no further changes need to be made.

After clustering is finished, data points are reassigned to clusters. However, the clusters may have very different densities in terms of data point distributions within clusters. Reassignment achieves two goals. First, it enables an ability to identify data points that should be assigned to multiple clusters and data points that should not be assigned to any clusters. Second, data points can be assigned different degrees to which they belong to their clusters, providing valuable information about the goodness of a cluster. There are many ways to determine membership degrees of points belonging to clusters. According to one embodiment of the present invention, a data point's membership in a cluster is inversely proportional to the ratio of its distance to the cluster over the sum of its distances to other clusters.

By examining values of membership degrees of a data point to clusters, it is possible to decide how to assign the data point. According to one embodiment of the present invention, the data point membership is examined to identify top values that are almost the same. If there are a few top values that are almost the same and are significantly larger than the next smaller value, the data point is simultaneously assigned to all clusters corresponding to the top values. On the other hand, if there are many top values that are almost the same, the data point is not assigned to any cluster.

In an alternate embodiment of the present invention, clustering of items as illustrated in FIG. 4 is modified to accommodate fuzzy clustering. At step S412, instead of randomly distributing the items, each item (or data point) is assigned a random fuzzy membership function. As is well known, the fuzzy membership function attempts to distribute the items to different categories based on appropriateness (or relevance). For example, a particular item's occurrence might be distributed 60% in a first category, 10% in a second category, 3% in a third category, etc. At step S418, instead of redistributing items, the fuzzy membership functions are recalculated for each item. At step S420, the change in clusters is measured by the change in energy of the summation of the distance from each item to each cluster center, scaled by the corresponding membership function value for that item/cluster center pair.

Classification Using Trainable Semantic Vectors

Figure 5:
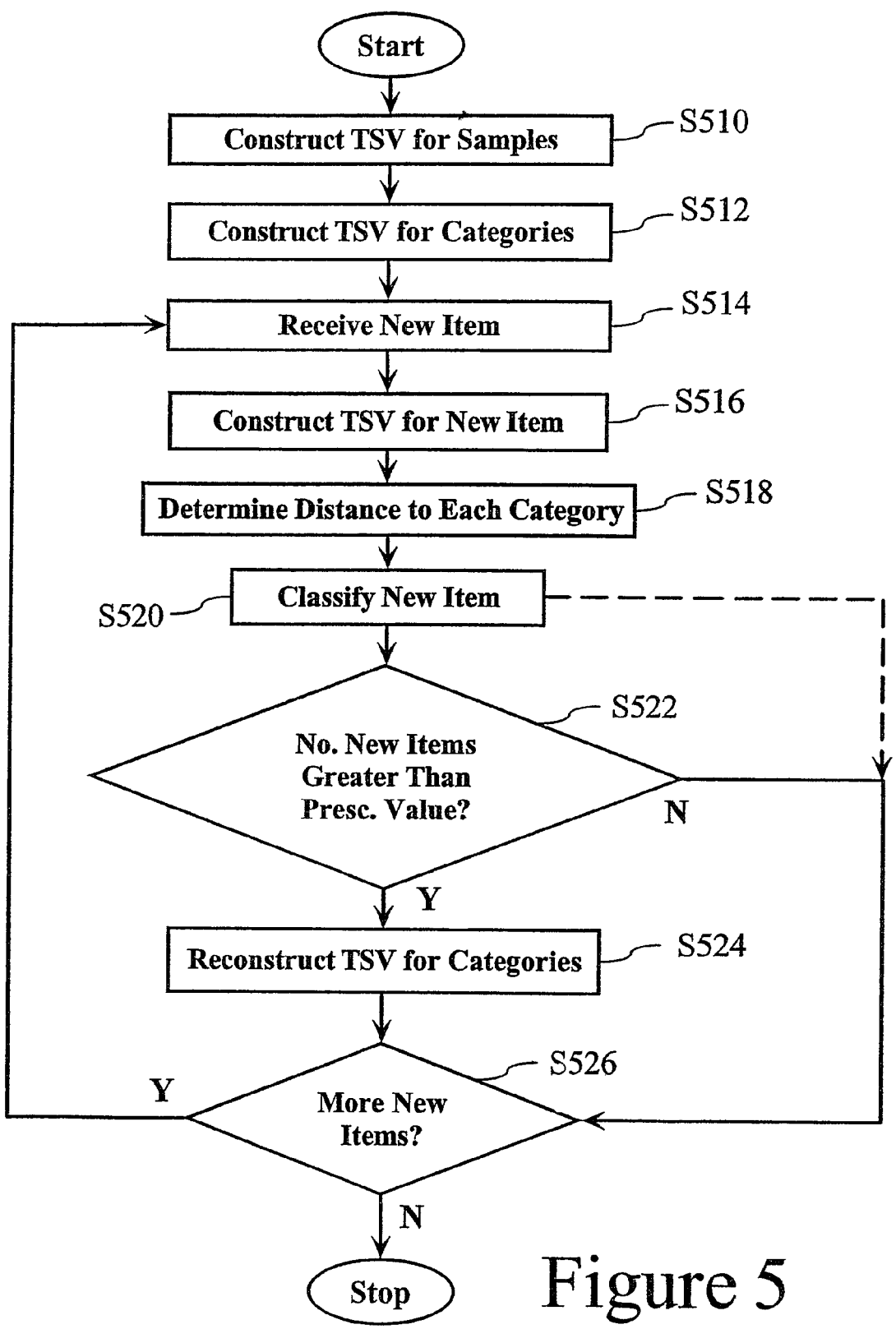
FIG. 5 is a flow chart illustrating classification of items according to an embodiment of the present invention.

FIG. 5 is a flowchart illustrating the steps performed in classifying items according to an embodiment of the present invention. The present method advantageously allows a plurality of items to be classified in various categories based on similarities determined from the semantic representation of the items. Importantly, the categories need not necessarily correspond to the semantic dimensions of the trained TSV, as is often required by other methods. Further, it is not even necessary to predefine the categories. Rather, the bootstrapping method described above can optionally create new semantic category definitions based solely on a collection of unlabeled items.

Traditionally, classification of items such as documents has required significant user interaction. For example, in order to assign a new document to a proper class or category, a user must be available to substantively review the document and assign it to a category. Moreover, the user must be an expert who understands both the classification system and the document contents. Such a procedure is extremely time consuming. Additionally, the classification process is prone to potential human errors and inconsistencies, particularly if performed by multiple users. The aforementioned errors and inconsistencies can be minimized through the use of an automatic classification system, as disclosed by the present invention.

Referring to FIG. 5, the disclosed classification methodology begins with construction of a TSV for each sample item that is originally present. This is indicated at step S510. The sample items can be used to initially define and represent the classification categories. Alternatively, the classification categories can be predefined, and the sample items would be used to represent the categories. Regardless of the initial use of the sample items, the TSV is constructed in accordance with the procedures previously described.

At step S512, a TSV is constructed for each category. This process is similar to the construction of a dataset TSV from several data point TSVs, in the sense that the TSVs from each sample item are combined into a TSV for the category. In the case of category TSVs, one embodiment of the present invention provides for determining the centroid of the category by calculating the mean value for each dimension across all samples assigned to that category. It should be appreciated, however, that the sample TSVs could also be combined using different operations. Importantly, constructing an explicit TSV for each category allows for the case that a classification category might not correspond directly to a single TSV dimension. In the special case that a category does correspond to a single dimension, the corresponding TSV is a unit vector with 1 in that dimension and 0 in all other dimensions.

According to one embodiment of the invention, a clustering process such as the one previously described with respect to FIG. 4 can also be used to identify a requisite number of categories, and automatically classify the samples therein. Once all the samples have been classified, each category would be representative of certain conditions or similarities that are common to all samples contained therein.

Consider, for example, a situation where additional items are received and must be classified within the previously defined categories. At step S514, the new item is received. The manner in which the new item is received can vary from system to system. For example, the new item can be received by directly accessing a local storage device, or it can be received from a remote location via a network connection. At step S516, a TSV is constructed for the new item. The distance between the TSV and each category is then determined at step S518. According to one embodiment of the invention, this can correspond to the Euclidean distance between the TSV of the new item and each category TSV. At step S520, the new item is classified. More particularly, the new item is assigned to the category whose category TSV has the shortest distance to the new item TSV.

As suggested by the phantom line in FIG. 5, control can optionally pass directly to step S526 after the new item has been classified. Alternatively, control passes to step S522. A step S522, the number of new items classified is compared to a prescribed value. The prescribed value can be selected based on the number of items being classified and the number of categories. Step S522 is performed for several reasons, for example, as new items are added to the categories the nature of the similarities between all items can often change. Hence, the first item added to a category may be quite different in similarity from the last item added to the category. This does not necessarily change the fact that each item may be closest in similarity to the original samples that were in the category. Rather than continuing to classify newly received items based on the original categories, step S522 initiates a process wherein the nature of each category is reevaluated. This iterative approach enables the classification algorithm to adapt to changes in data and definition over time. If the number of new items classified is greater than the prescribed value, then control passes to step S524. If the number of new items classified is not greater than the prescribed value, then control passes directly to step S526.

At step S524, the category TSVs are optionally reconstructed. More particularly, the reconstructed category TSVs are recalculated according to the method described earlier to represent the semantic dimension across the space of the original sample items within that category as well as the newly added items within that category. Consider an example where fifty sample items are assigned to five categories. If an additional thirty items are added, then the centroid of each category TSV will be recalculated based on both the original sample items and the newly added items. Further, all items (the original sample items as well as the newly added items) can be optionally reclassified such that they are more accurately represented by the revised category definitions.

At step S526, it is determined if more new items require classifying. If additional new items must be classified, then control returns to step S514, where a new item is received and classified within one of the categories. Alternatively, if no additional items require classification, then control passes to step S528 where the classification process terminates.

According to an alternative embodiment of the present invention, classification of items exploits the special case where the desired classification categories are identical to the TSV dimensions. In this case, it is not necessary to calculate category TSVs, and it is not necessary to calculate distances between items and categories. Rather, each new item is classified based solely on the TSV of that item. For example, the item can be assigned to the category that corresponds to the dimension with largest value in the item's TSV. Alternatively, the item can be assigned based on the distribution of top values of its TSV. An advantage of this alternative embodiment is the significant speed and efficiency with which new items can be classified.

Figure 6:
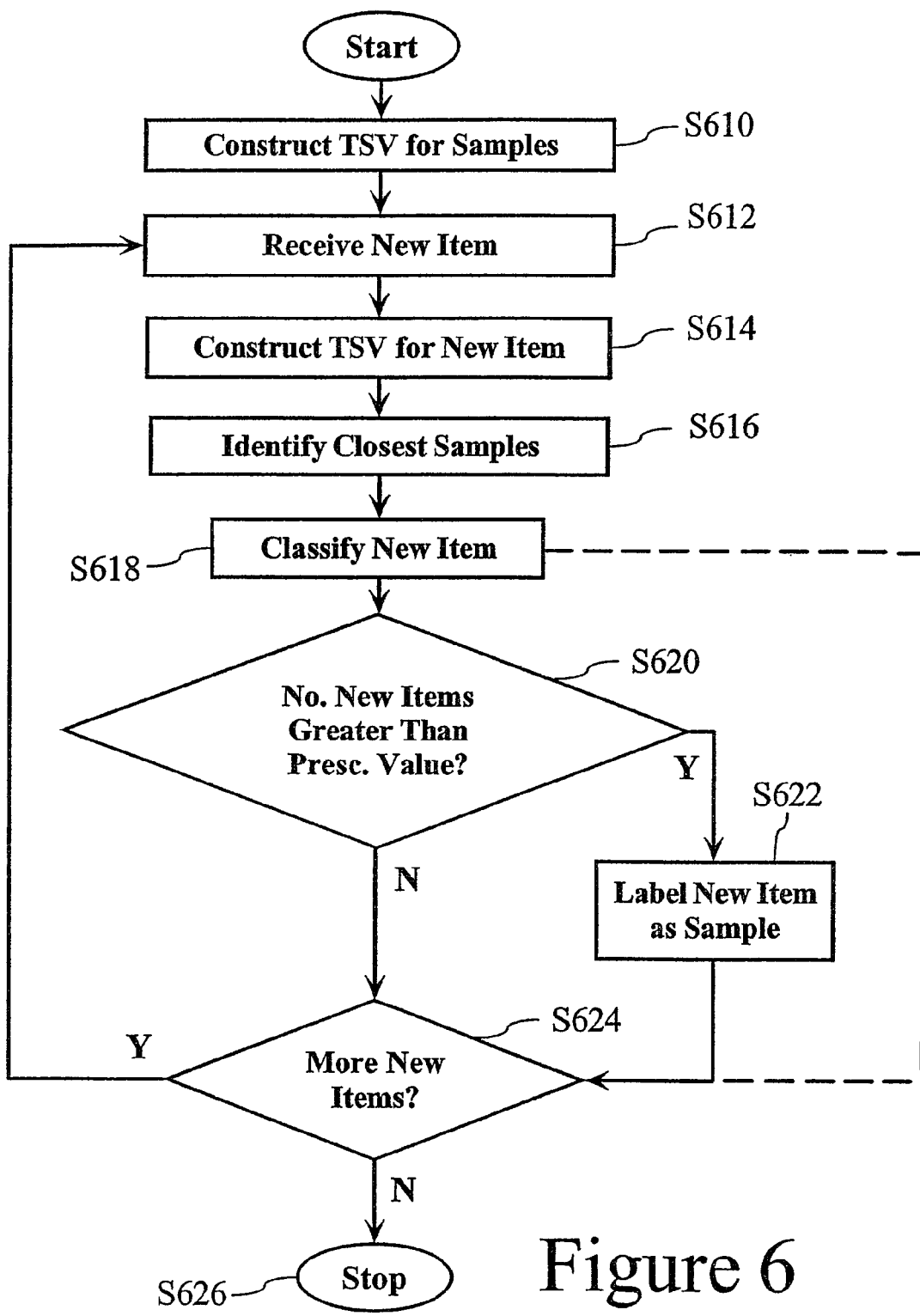
FIG. 6 is a flow chart illustrating classification of items according to an alternative embodiment of the present invention.

FIG. 6 is a flow chart illustrating classification of items according to an alternative embodiment of the present invention. At step S610, a TSV is constructed for each sample item. Rather than constructing a separate category TSV, as in the previous embodiment, the samples are merely assigned to the relevant categories. At step S612, a new item is received. At step S614, a TSV is constructed for the new item.

At step S616, the closest samples to the new item are identified. This can be done in many ways. According to one embodiment of the invention, the TSV for each sample item and each previously classified item is examined to identify which sample item is closest to the new item (i.e. it's TSV). As the number of items (i.e., new items) that are categorized increases, the requirements for storing and examining the TSV for each sample and new item can render such a process inefficient. If, however, the storage requirements are available and the computational power required to perform the date manipulations are present, then the new items can still be efficiently classified.

According to the embodiment of the invention illustrated in FIG. 6, a predetermined number of sample items from each category are examined. The TSVs for the selected samples item are then compared to the TSV of the new item in order to identify the closest sample item. Such an embodiment has an advantage of minimizing the storage and computational requirements necessary to classify the items.

At step S618, the new item is classified. This is accomplished by assigning the new item to the category which contains the closest sample. Although the previous description indicates that the closest sample to the new item is identified and used in the classification of the new item, it should be noted that certain variations are permissible. For example, the closest two or three (or various) samples can be used in determining which category to classify the new item in. At step S620, the number of new items classified is compared to a prescribed value. If the number of new items classified is greater than the prescribed value, then the new item is labeled as a sample item at S622. Accordingly, the new item will now be available for use in classifying subsequent new items. This step allows for adaptation to changes in data and definitions over time. If the number of new items is less than the prescribed value, then control passes to step S624.

At step S624, it is determined whether any additional new items require classification. If so, then control returns to step S612 where the additional items are received and classified. Alternatively, if no additional items require classification, then control passes to step S626 where the classification process terminates. As with the previous embodiment of the invention, control can optionally pass from step S618 directly to S624 as indicated by the phantom line. Such a step would again correspond to the classification of new items based on the original nature of the categories, and without any regard to changes or variations that occur as a result of new items being classified.

Searching Using Trainable Semantic Vectors

As previously discussed, typical search systems are keyword or word/term based. Such systems take a query consisting of keywords as input; locate documents containing some or all the keywords; and return these documents. Various formulas and statistical manipulations can be performed to identify important words so that they can be weighed more heavily than others. These techniques can be difficult to implement with consistency and do not always provide accurate results.

Figure 7:
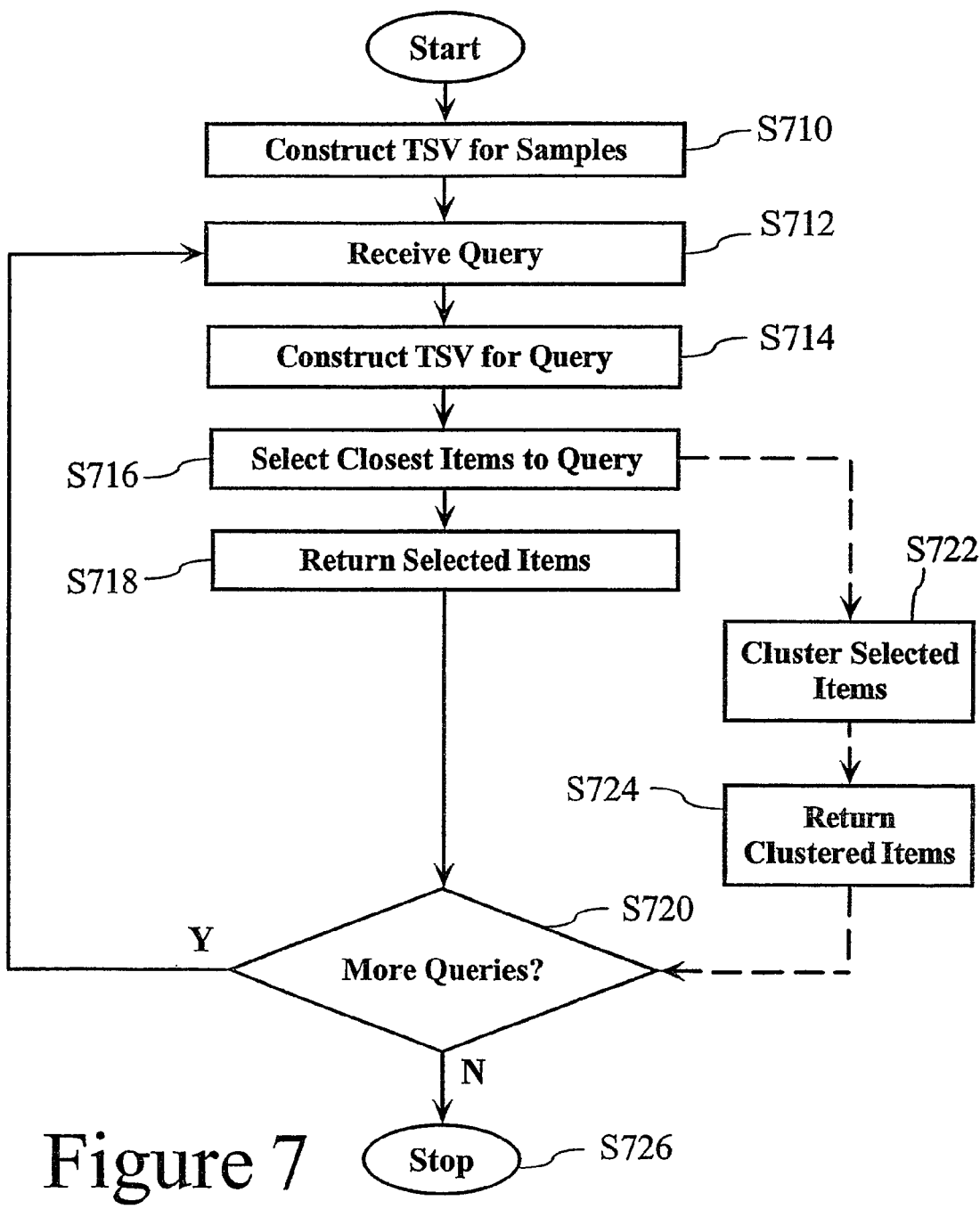
FIG. 7 is a flow chart illustrating query processing according to an embodiment of the present invention.

FIG. 7 is a flow chart illustrating the steps performed to process a query according to an embodiment of the present invention. As previously indicated, the present invention provides semantic representations of items and descriptors for the items. Moreover, the semantic representation of the items and their descriptors are substantially similar in format. Additionally, the relevance of one item to another (or one descriptor to another) can be determined based on the distance between the semantic vectors. Such an ability allows implementation of search and retrieval techniques using a semantic representation for the search query.

Consider a large collection of items that are desired to be retrieved based on a user query. FIG. 7 illustrates a methodology for presenting queries and retrieving items from the collection based on semantic information contained in the query. At step S710, the collection of items is initialized for searching by constructing a TSV for each item. At step S712, a query is received. The query can be in the form of one or more descriptors that provide information about items in the collection. For example, if the items in the collection are a set of documents, then the query can be in the form of a plurality of terms and/or phrases that should be present in a relevant document. Alternatively, the query can be a body of text (i.e., a natural language query) entered by the user that describes the desired features of relevant documents.

At step S714, a TSV is constructed for the query. The query TSV corresponds to the semantic representation of the descriptors input by the user across the semantic space within which the items are classified. In other words, the query TSV will have the same number of dimensions as the TSV for each item. At step S716, the items that are closest to the query are selected. This corresponds to the selection of items whose TSVs are closest to the TSV of the query. Depending on how broad or specific the query is, the number of items selected can vary. According to one embodiment of the present invention, a maximum number of items can be provided. This can be done either manually by the user, or automatically depending on the number of items selected.

At step S718, the selected items are returned as the query result. It should be noted that there is no requirement that the actual items be returned. Rather, only a significant portion of the item need be returned to provide the user an opportunity to consider whether the item is actually relevant and requires further examination. At step S720, it is determined whether additional queries must be processed. If so, then control returns to step S712 where the query is received. If there are no additional queries that require processing, then control passes to step S726 where the procedure ends. According to one embodiment of the present invention, the query results can be clustered at step S722. This provides an added benefit of grouping the documents together based on particular similarities. At step S724, the clustered items are returned to the user. Control then passes again to step 720 where the search procedure is terminated.

The present system advantageously provides an ability to search information such as documents. This is accomplished by representing information such as words, phrases, sentences, documents, and document collections in the same way within the system (i.e., using a TSV). Moreover, any similar information (i.e., text, single word, phrase, sentence, or entire document) can be used for input as a query to the search system. The query is translated to a TSV, and matched against the TSVs of all the documents in the search system. The results obtained are more robust and often more accurate than standard keyword searches.

The present system can be used in a variety of areas, as long as predefined categories are available. The present system can also be used to add semantic searching to keyword-based systems. The results of the two searches are then combined. More particularly, word-based searches are often too specific and depend greatly on the selection of keywords. Hence, when the keywords are poorly selected, the results obtained are very bad. By using both systems, the results can be better than either system alone. Alternatively, semantic searching capabilities of the present system can be used as a filter, and keyword search can be performed on the filtered results of the semantic search or vice-versa.

The search methodology of the present invention enjoys applicability in a wide range of media such as, for example, patents, scientific journals, newspapers, etc. The subject matter of the new domain is not relevant as long as there is sufficient training information to define categorical relationships. Furthermore, the methodology is equally applicable to other forms of data such as numeric, categorical, pictorial, or mixed data.

Another advantage of the present system is an automatically generated, customized thesaurus and query expansion capability. The system can automatically train a word-TSV table on sample documents from a particular subject area. The word-TSV table is a table containing entries from one or more datasets. The system can then take an input word, find the corresponding TSV, and compare that TSV to all other TSVs in the dictionary. The dictionary can be defined by the number of rows in the word-TSV table. Accordingly, the contents of the dictionary will vary depending on the information being represented. For example, if a word-TSV table is constructed, then the dictionary will contain each word that occurs in a category. Further, if words and phrases are both examined with respect to the categories, then the dictionary will contain both words and phrases. If two TSVs are substantially close as measured by their distance, then the corresponding words or phrases are similar within the context of the subject area. Again, distance is preferably measured by Euclidean distance in multi-dimensional space, although any typical distance measure can be used such as Hamming distance, Minkowski distance, or Mahalanobis distance.

For example, the TSV for the word "marker" might be represented as follows:

[0.00 0.10 0.01 0.59 0.20 0.06 0.05.]

The TSV is strong in certain categories and weak in others. Now, the semantic dictionary is searched for words and phrases that have similar patterns. This will provide an indication of which words/phrases are used in the same context as "marker". Importantly the retrieved words/phrases do not have to be synonymous with "marker". Rather, if these words are put into the query, it should reinforce the right categories and improve results. In other words, the present system provides an ability to automatically expand either a keyword or natural-language query. This expansion can be used to improve results of a search engine.

Example 1

Figure 8:
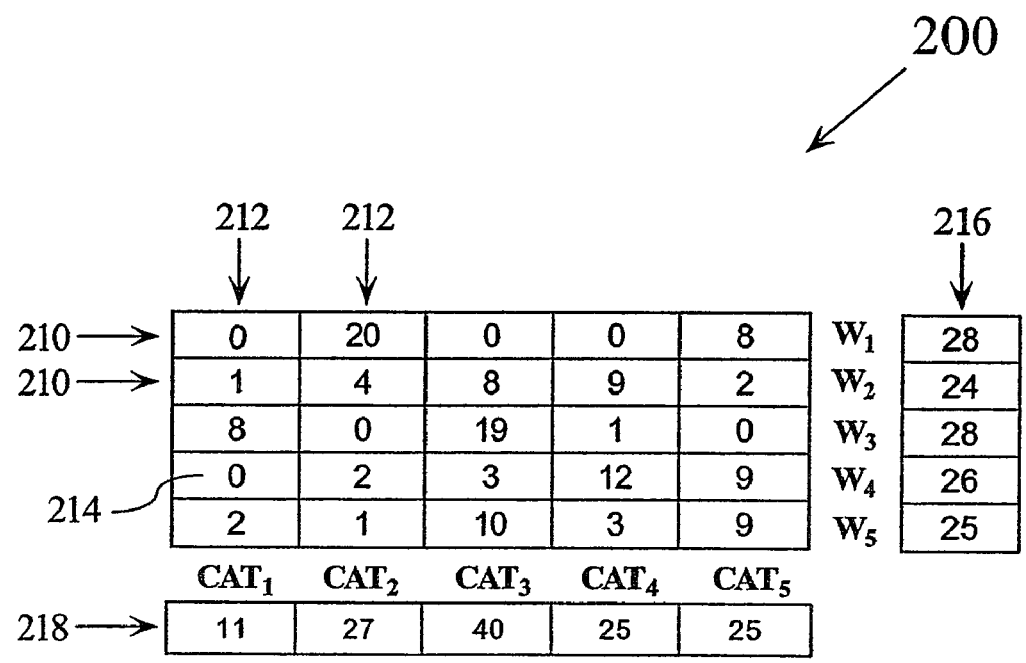
FIG. 8 is a table illustrating relationships between words and categories.

FIG. 8 illustrates an exemplary representation of words within a semantic space according to an embodiment of the present invention. For simplicity and ease of understanding, the number of words represented in the semantic space and the number of dimensions of the semantic space have been reduced to five. As illustrated in FIG. 8, the table 200 contains rows 210 that correspond to the dimensions of the semantic space, and columns 212 representative of the category corresponding to the semantic dimensions. The actual words represented in the semantic space can be referred to as $W_1$, $W_2$, $W_3$, $W_4$, and $W_5$. Similarity, the categories can be referred to as $Cat_1$, $Cat_2$, $Cat_3$, $Cat_4$, and $Cat_5$. Each entry 214 within table 200 corresponds to a number of documents that have a particular word occurring in the corresponding category.

Summation of the total number of columns 212 across each row 210 provides the total number of documents that contain the word represented by the row 210. These values are represented at column 216. Referring to FIG. 8 word $W_1$ appears twenty times in category $Cat_2$ and eight times in category $Cat_5$. Word $W_1$ does not appear in categories $Cat_1$, $Cat_3$, and $Cat_4$. Referring to column 216, word $W_1$ appears a total of 28 times across all categories. In other words, twenty-eight of the documents classified contain word $W_1$. Examination of an exemplary column 212, such as $Cat_1$, reveals that word $W_2$ appears once in category $Cat_1$, word $W_3$ appears eight times in category $Cat_1$, and or $W_5$ appears twice in category $Cat_1$. Word $W_4$ does not appear at all in category $Cat_1$. As previously stated word $W_1$ does not appear in category 1. Referring to row 218, the entry corresponding to category $Cat_1$ indicates that there are eleven documents classified in category $Cat_1$.

With continued reference to FIG. 8, FIG. 9 illustrates a table 230 that stores the values that indicate the relative strength of each word with respect to the categories. Specifically, the percentage of data points occurring in each category (i.e., u) is presented in the form of a vector for each word. The value for each entry in the u vector is calculated according to the following formula:

$$u = \text{Prob}(\text{entry}|\text{category}) = (\text{entry}_n, \text{category}_m)/\text{category}_{m\_total}$$

Table 230 also presents the probability distribution of a data point's occurrence across all categories (i.e., v) in the form of a vector for each word. The value for each entry in the v vector is calculated according to the following formula:

$$v = \text{Prob}(\text{category}|\text{entry}) = (\text{entry}_n, \text{category}_m)/\text{entry}_{n\_total}$$

Table 230 also presents the probability distribution of a data point's occurrence across all categories (i.e., v) in the form of a vector for each word. The value for each entry in the v vector is calculated according to the following formula:

$$v = \text{Prob}(\text{category}|\text{entry}) = (\text{entry}, \text{category}_m)/\text{entry}_{n\_total}$$

Turning now to FIG. 10, a table 250 is shown for illustrating the semantic representation of the words from FIG. 8. Table 250 is a combination of five TSVs that correspond to the semantic representation of each word across the semantic space. For example, the first row corresponds to the TSV of word $W_1$. Each TSV has dimensions that correspond to the categories of the semantic space. Additionally, the TSVs are calculated according to an embodiment of the invention wherein the entries are scaled to optimize the significance of the word with respect to that particular category. More particularly, the following formula is used to calculate the values.

$$\alpha(v) + (1-\alpha)(u)$$

The entries for each TSV are calculated based on the actual values stored in table 230. Accordingly, the TSVs shown in table 250 correspond to the actual representation of the exemplary words represented in FIG. 8.

Example 2

Figures 11, 12:
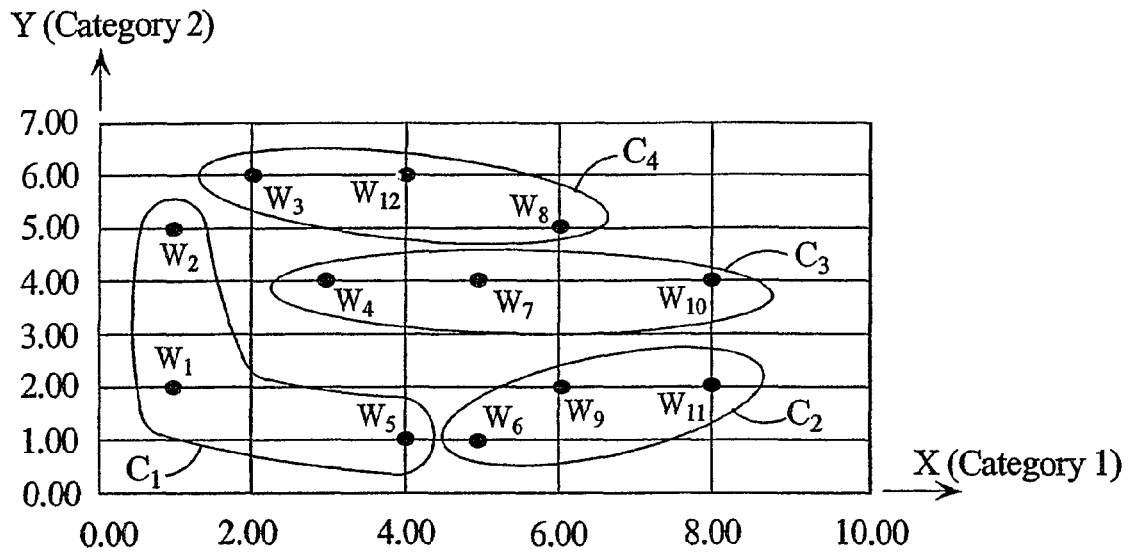
FIG. 11 is a graph illustrating the manner in which a plurality of words are clustered according to an embodiment of the present invention.
FIG. 12 is a table indicating the X and Y coordinates of each word plotted in the graph shown in FIG. 11.

Turning now to FIG. 11, a graph is shown for illustrating the manner in which a plurality of words ($W_1$ to $W_{12}$) can be clustered according to the present invention. For simplicity, the semantic space is defined using only two dimensions, and only twelve words are used. In other words, there are only two categories and each word has a value for that category. The result is a two-dimensional coordinate for each word. Note that documents would be clustered in the same manner as words.

Referring additionally to FIG. 12, a Table is shown that shown that stores the X and Y coordinates of each word plotted in the graph shown in FIG. 11. During the clustering process, the twelve words are initially distributed among a plurality of clusters. As shown in FIG. 11, four clusters have been defined ($C_1$ to $C_4$). Each cluster contains three words. Since the words were randomly assigned to the clusters, the three words in any of the clusters may not necessarily be similar. Next, centers are calculated for each of the four clusters.

Figure 13:
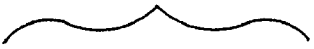
FIG. 13 is a table indicating the coordinates of the center of each cluster shown in FIG. 11.
Figure 14:
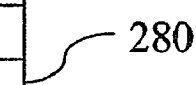
FIG. 14 is a table indicating the distance between each word and cluster center.
Figures 15, 16:
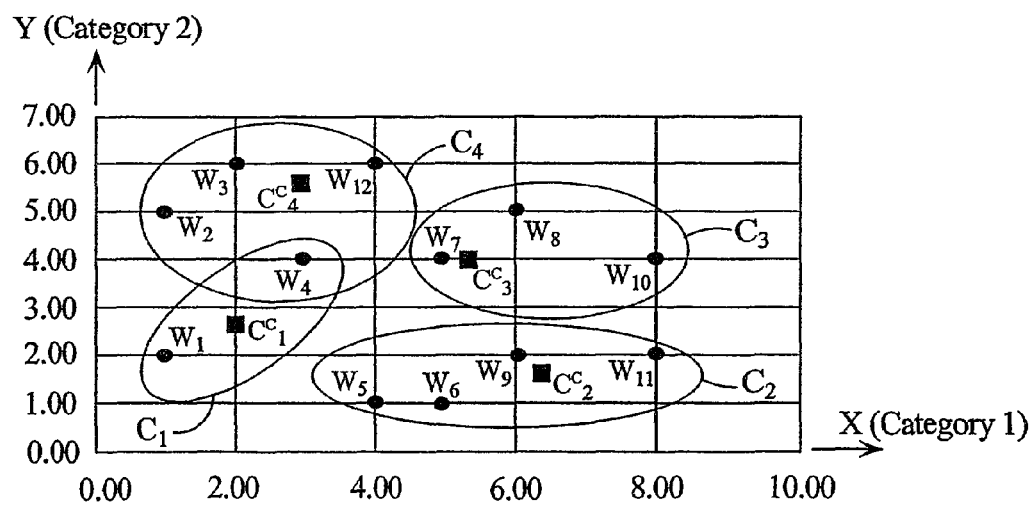
FIG. 15 is a table indicating the content of each cluster after redistribution of the words.
FIG. 16 is a graph illustrating the redistributed words among the clusters.

Referring additionally to FIG. 13, the coordinates of the cluster centers are shown. The distance between each word and the calculated cluster centers is then determined. The result of this operation is indicated by table 280 illustrated in FIG. 14. The entries in table 280 indicate the actual distance between a particular word and a calculated cluster center. For example, the distance between word $W_1$ and cluster center $C^c_1$ is 1.20. Likewise the distance from word $W_1$ to cluster center $C^c_3$ is 4.77. This calculation is performed for each of the twelve words. The closest cluster center is then identified for each word. For example, the closest cluster center to word $W_1$ is cluster center $C^c_1$. The words are then redistributed to the cluster having the shortest distance. The redistribution of words is shown in FIG. 15. Specifically, cluster $C_1$ will now contain $W_1$ and $W_4$, while cluster $C_2$ will now contain $W_5$, $W_6$, $W_9$ and $W_{11}$, etc. Word $W_2$ is equally spaced between cluster $C_1$ and $C_4$. Accordingly, $W_4$ can be redistributed to either cluster $C_1$ or cluster $C_4$ or both.

FIG. 16 is a graph illustrating the redistributed words and cluster centers within the semantic space. As shown in FIG. 16, the nature of the clusters has changed. Additionally, brief examination of the graph shows that the words are now closer to the center of the new clusters than before. As previously stated, the closer the semantic representation of two words are, the greater the similarities therebetween. Once the words have been redistributed to the clusters, as shown in FIG. 16, the cluster centers will again be calculated and the distance between each word to the cluster centers determined. Based on the second recalculation, one or more words may be redistributed to different clusters that more accurately indicate the information represented by the word. As previously stated, this process can continue until a convergence factor is reached.

Example 3

The methodologies of the present invention have been used to semantically represent U.S. patents issued between 1974-1997 (i.e., approximately 1.5 million documents). The text of the "Summary" and "Background of the Invention", and US classification was used as the raw data. Any information in the patent could have been used. For example: abstract, detailed description, international class, cross-reference, field of search, etc. The selected sections, however, provided sufficient descriptions of the patent to support accurate classification. The result is approximately 50 gigabytes of text.

A set of categories, called the Manual of Classification (MOC), already exists for U.S. patents. The problem with the MOC, however, is that it is not very useful for automation purposes. There are about 400 classes at the top level and over 130,000 subclasses at the lowest level. The top-level classes do not provide sufficient detail, while the subclasses provide too much detail. Additionally, some classes are over 13 levels deep. This is unreasonably detailed.

The present invention addresses these problems by redefining a set of categories that can be used efficiently for automated processing and analysis. A category selection routine was applied to the MOC in order to achieve about 3,000 categories. The routine begins by examining the top level of the MOC (i.e., 400 classes). Any classes that contain less than a minimum number (e.g., 100) of patents are discarded. The reasoning is that such classes will not contain enough statistical information to reliably identify them. The routine then continues examining and (possibly) discarding subclasses and sub-subclasses through the MOC. If at any point more than 10% of the patents under a (sub)class would be discarded, that (sub)class is retained without expansion and all lower subclasses are collapsed together. If any of the remaining (sub)classes are larger than a predetermined maximum amount (e.g., 300), then that (sub)class is reduced by randomly selecting no more than the maximum number of sample patents from that (sub)class. Preferably, all of the classes are manipulated so that they contain 4 levels of subclasses or less. If a class includes more than 4 levels, then it is assumed that the distinctions being made are so fine that it's not possible to automate reliably. For example, chemical patents tend to be deep in subclass levels, while mechanical patents tend to be shallow. However, the details in the chemical patents that necessitate further subclassification are typically too specific to be distinguished by automated text analysis.

The result of this routine is a collection of about 3,000 categories, each containing between 100 and 300 sample patents. Some manual filtering and examination is also performed in order to insure that the categories are representative of the classes from the MOC.

The ultimate goal is to provide semantic searching, classification, clustering, and data manipulations. In order to accomplish this goal, there is a lower level goal to have semantic representations for words, documents, and categories. Additionally, the system must be able to process large amounts of data without human intervention. A semantic representation of the data was achieved using the 3,000 categories. This is in contrast to current systems that use complex semantic networks to link data; such semantic networks typically require substantial manual effort to construct, manipulate, and extend.

Each of the training patents is now reclassified using a straightforward mapping from the original full MOC classification to the corresponding TSV category. Using this mapping along with the text of the patents, statistics are collected for word usage. All the textual information stored for each patent (i.e., summary and background) is examined. Each word or phrase that occurs in the stored text of a patent is assigned to (or used to increment the count for) the category to which the patent belongs. Words that occur multiple times in a patent are only counted once. For example, if a particular word occurs in 10 patents belonging to category 15, then the word will have a count of 10 within category 15, while a word that occurs 10 times in a single patent belonging to category 15 will only have a count of 1. Similarly, a particular word can appear in different categories with different respective counts. This is repeated for each of the training patents. These counts are preferably stored in tabular form such that each row represents a word and each column represents a category. Finally, a total count representing the number of times a word is used in each of the 3,000 categories is tabulated into a separate column (i.e., column 3,001). An additional row can be provided that sums the values contained in each column. Such a row would indicate the number of patents that occur in each category. The result is a word-class table.

Additional data manipulation is performed, both manually and automatically, in order to fine tune the list of recognized words. For example, a preliminary filtering is performed in order to eliminate certain common words called stopwords. The list of stopword includes standard stopwords such as "a", "for", etc, as well as patent specific stopwords such as "claim". A standard list of stopwords can be used alone, however, the results would not be as accurate or robust as can be achieved when the list is populated with patent specific stopwords. Stemming is also performed on words; either inflectional or derivational stemming can be used, but for patent text derivational stemming is preferred. In addition, the present invention was configured to identify certain phrases such as "tracking system" appearing in the patent when constructing the word-class table. More particularly, the table (i.e., the semantic dictionary) contains both words and phrases. Other filtering criteria include removing words that occur too frequently (say, more than 35% of the training patents) or too rarely (say, less than 5% of the training patents). After this fine-tuning, the result is a word-class table with approximately 3,000 columns of categories and approximately 650,000 rows of words and phrases. Next, the values for u and v were determined in accordance with the previously described methodology.

Next, each patent is examined individually and the TSVs (i.e., vectors) associated with all the words in the patent are retrieved. The vectors are combined to produce an overall semantic representation of the patent. Specifically, the respective columns in the vectors for all the words (and phrases) in a particular document are added together, and scaled by a "vote" vector. The vote calculates, for each category, the number of words from the patent that make at least a minimum contribution to that category. If a word does not hit a minimum number of categories with a certain strength, that word is removed from the document. The result of this step is a patent-TSV table consisting of one semantic vector for each patent.

One advantage of the present system is that it is automatically trainable. Given sufficient training data (sample documents and corresponding categories), the system can automatically create new semantic dictionaries (word-TSV tables) and semantic representations of documents (doc-TSV tables). The system can also automatically use that new representation to perform clustering, classification, and other tasks as described herein.

Another advantage of the present system is that everything is represented the same way (i.e., using a TSV). Individual words from the semantic dictionary are represented the same way as documents within the present system. This allows one to take, for example, a one or two-word query; look it up in the semantic dictionary; and get something that looks like a document. The result is then compared to actual document TSVs to obtain the closest match.

Another advantage of the present invention is the ability to perform unsupervised processes such as clustering. In the case of clustering, for example, the only information required by the clustering algorithm is the dataset itself. The number of groups to be constructed can, optionally, be provided to the clustering algorithm, although this is not necessary to complete the task. The system would then generate these groups and assign data points (i.e., documents) to each group.

The disclosed system is not restricted to just the sample applications and subject areas described here; it can be used in any situation where search, clustering, or classification is needed. For example, another application is automatic classification documents on the World Wide Web. Another sample application is automatically answering natural-language questions by classifying those questions against sets of "Frequently Asked Questions" (FAQs) and their corresponding answers or responses.

In the previous descriptions, numerous specific details are set forth, such as specific materials, structures, processes, etc., in order to provide a thorough understanding of the present invention. However, as one having ordinary skill in the art would recognize, the present invention can be practiced without resorting to the details specifically set forth. In other instances, well known processing structures have not been described in detail in order not to unnecessarily obscure the present invention.

Only the preferred embodiment of the invention and an example of its versatility are shown and described in the present disclosure. It is to be understood that the invention is capable of use in various other combinations and environments and is capable of changes or modifications within the scope of the inventive concept as expressed herein.

What is claimed is:

1. A method for a data processing system to efficiently identify at least one data set from a collection of datasets according to a query containing information indicative of desired datasets, the method comprising the machine-executed steps:
   constructing a semantic vector for each dataset;
   receiving the query containing information indicative of desired datasets;
   constructing a semantic vector for the query;
   comparing the semantic vector for the query to the semantic vector of each dataset;
   selecting datasets whose semantic vectors are closest to the semantic vector for the query; and
   generating a result including information of the selected datasets according to a result of the selecting step;
   wherein:
   the query or each of the datasets includes at least one data point; and
   the semantic vector for the query or each of the datasets is constructed by the steps of:
   for each data point, constructing a table for storing information indicative of a relationship between each data point and predetermined categories corresponding to dimensions in the semantic space;
   determining a weighted significance of each data point with respect to the predetermined categories;
   constructing a semantic vector for each data point, wherein each semantic vector has dimensions equal to the number of predetermined categories and based on the weighted significance represents the relative strength of its corresponding data point with respect to each of the predetermined categories; and
   combining the semantic vector for each of the at least one data point to form the semantic vector of the query or each of the datasets.

2. The method of claim 1, wherein the datasets correspond to documents and the query is a natural language query.

3. The method of claim 1, further comprising the steps:
   performing a second search for datasets within the collection of datasets, wherein the second search using a method other than semantic vectors;
   combining the two search results to obtain a combined weighted score for each dataset in either of the two search results;
   selecting datasets whose combined weighted score is largest.

4. The method of claim 1, further comprising a step of clustering the selected datasets in real time.

5. A method for efficiently identifying data points in a semantic lexicon related to a dataset, the method comprising the machine-executed steps:
   constructing a semantic vector for the dataset;
   comparing the semantic vector for the dataset to semantic vector of each of the data points in the semantic lexicon;
   selecting data points whose semantic vectors are closest to the semantic vector for the dataset; and
   adding said selected data points to said dataset;
   wherein:
   the dataset includes at least one data point; and
   the semantic vector for the dataset is constructed by the steps of:
   for each data point, constructing a table for storing information indicative of a relationship between each data point and predetermined categories corresponding to dimensions in the semantic space;
   determining a weighted significance of each data point with respect to the predetermined categories;
   constructing a semantic vector for each data point, wherein each semantic vector has dimensions equal to the number of predetermined categories and based on the weighted significance represents the relative strength of its corresponding data point with respect to each of the predetermined categories; and
   combining the semantic vector for each of the at least one data point to form the semantic vector of the dataset.

6. The method of claim 5, wherein the dataset is a document and the data points are words.

7. The method of claim 5, wherein the dataset is a natural language query in a search system and the data points are words.

8. A system for identifying at least one data set from a collection of datasets according to a query containing information indicative of desired datasets, the system comprising:
   a computer configured to:
   construct a semantic vector for each dataset;
   receive the query containing information indicative of desired datasets;
   construct a semantic vector for the query;
   compare the semantic vector for the query to the semantic vector of each dataset;
   select datasets whose semantic vectors are closest to the semantic vector for the query; and
   generate a result including information of the selected datasets according to a result of the selecting step;
   wherein:
   the query or each of the datasets includes at least one data point; and
   the semantic vector for the query or each of the datasets is constructed by the machine-executed steps of:
   for each data point, constructing a table for storing information indicative of a relationship between each data point and predetermined categories corresponding to dimensions in the semantic space;
   determining a weighted significance of each data point with respect to the predetermined categories;
   constructing a semantic vector for each data point, wherein each semantic vector has dimensions equal to the number of predetermined categories and based on the weighted significance represents the relative strength of its corresponding data point with respect to each of the predetermined categories; and
   combining the semantic vector for each of the at least one data point to form the semantic vector of the query or each of the datasets.

9. A non-transitory computer-readable medium carrying one or more sequences of instructions for efficiently identifying at least one data set from a collection of datasets according to an inquiry containing information indicative of desired datasets, wherein execution of the one or more sequences of instructions by one or more processors causes the one or more processors to perform the steps of:
- constructing a semantic vector for each dataset;
- receiving the query containing information indicative of desired datasets;
- constructing a semantic vector for the query;
- comparing the semantic vector for the query to the semantic vector of each dataset;
- selecting datasets whose semantic vectors are closest to the semantic vector for the query; and
- generating a result including information of the selected datasets according to a result of the selecting step;

wherein:
- the query or each of the datasets includes at least one data point; and
- the semantic vector for the query or each of the datasets is constructed by the steps of:
  - for each data point, constructing a table for storing information indicative of a relationship between each data point and predetermined categories corresponding to dimensions in the semantic space;
  - determining a weighted significance of each data point with respect to the predetermined categories;
  - constructing a semantic vector for each data point, wherein each semantic vector has dimensions equal to the number of predetermined categories and based on the weighted significance represents the relative strength of its corresponding data point with respect to each of the predetermined categories; and
  - combining the semantic vector for each of the at least one data point to form the semantic vector of the query or each of the datasets.

* * * * *